Patented Oct. 14, 1930

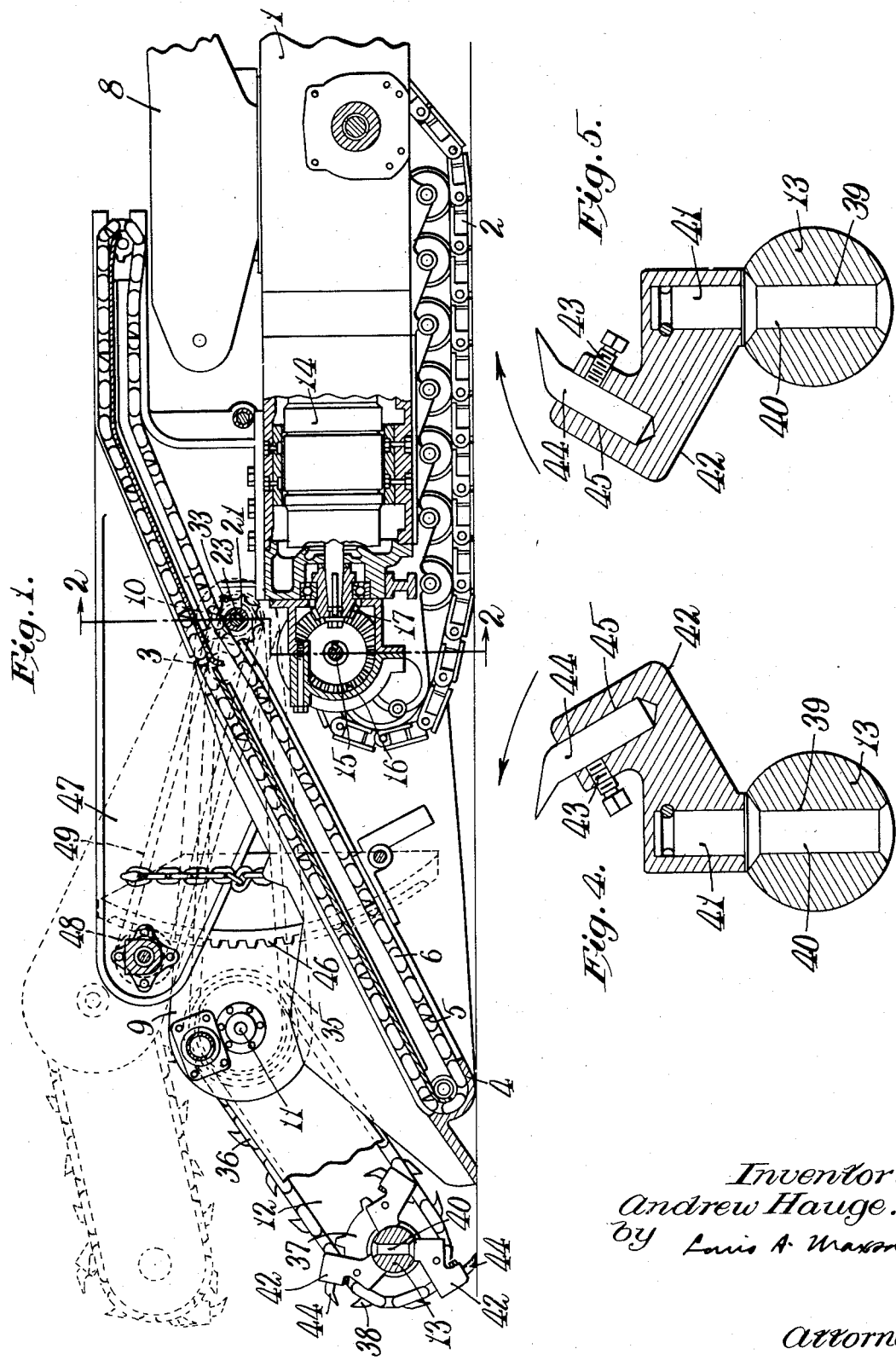

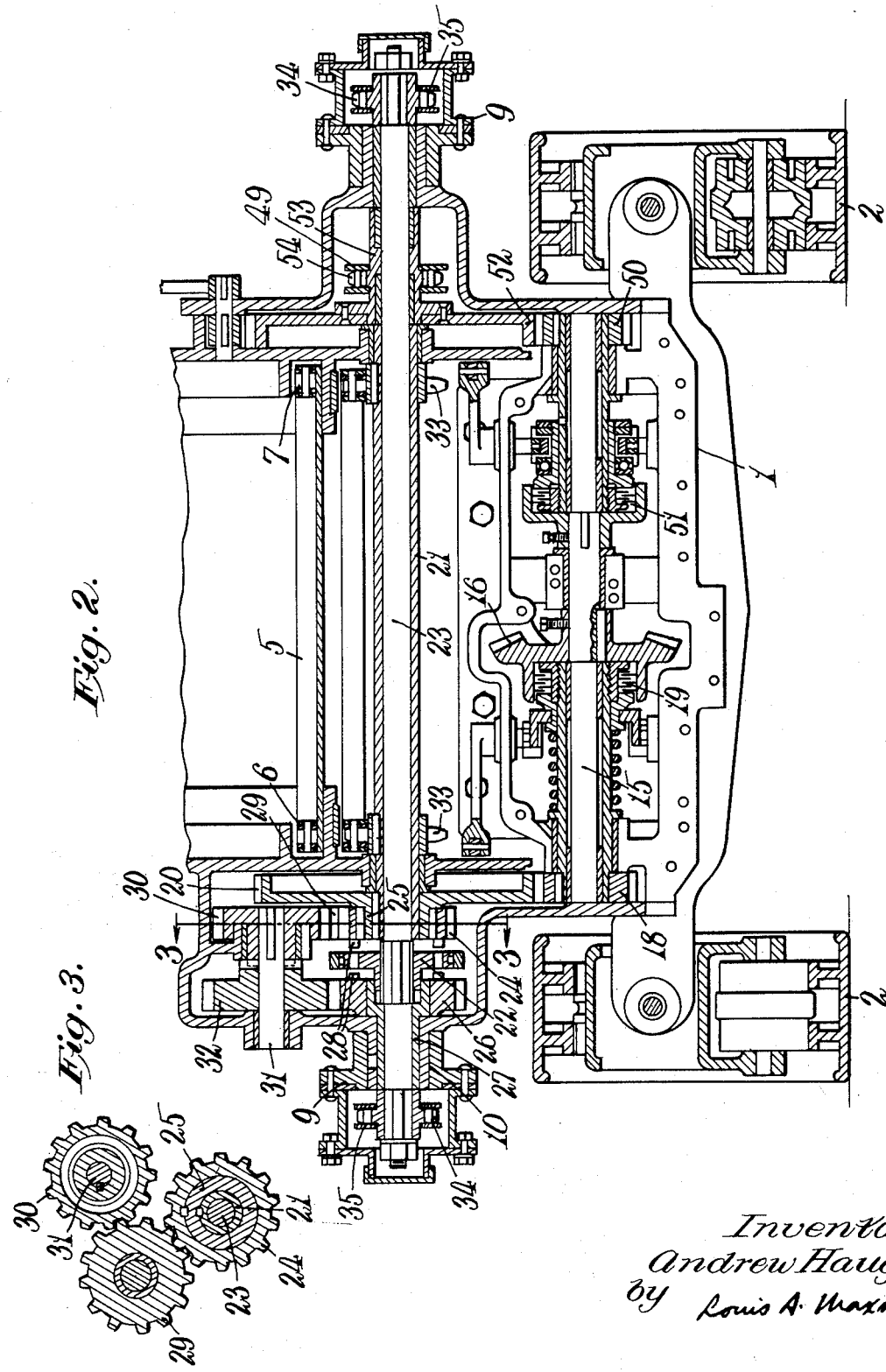

1,778,595

UNITED STATES PATENT OFFICE

ANDREW HAUGE, OF MICHIGAN CITY, INDIANA, ASSIGNOR TO SULLIVAN MACHINERY COMPANY, A CORPORATION OF MASSACHUSETTS

LOADING MACHINE

Application filed January 9, 1928. Serial No. 245,508.

My invention relates to loading machines of a type suited for loading coal at the working face of the mine and more particularly to an improved means for breaking loose the shot material to be loaded and moving it toward the loading machine.

It is an object of my invention to provide an improvement in a loading machine. Another object is to obtain an improved device for breaking loose the shot material to be loaded and for assisting in its movement toward conveyor mechanism. A further object is to provide an improved reversible roller for a loading machine, having teeth mounted thereon in such a manner as to automatically assume the most effective position in either direction of rotation of the roller. Still another object is to provide an improved reversible toothed gathering roller for a coal loading machine which has improved pivotal mountings for the reversible teeth whereby the teeth are automatically reversed upon reversal of the roller. Other objects and advantages will hereinafter more fully appear.

In the accompanying drawings there is shown for purposes of illustration one preferred form which my invention may assume in practice.

In these drawings:—

Fig. 1 is an elevational view of a loading machine embodying the illustrative form of my invention, with parts shown in section.

Fig. 2 is a sectional view on line 2—2 of Fig. 1.

Fig. 3 is a detail sectional view taken on line 3—3 of Fig. 2.

Figs. 4 and 5 are detail sectional views of the roller showing the different positions of a tooth when the roller is rotated in opposite directions.

I have shown the illustrative form of my invention embodied in a loading machine generally similar to one disclosed in the copending application of one Frank A. Halleck, Serial No. 230,334, filed Nov. 1, 1927. This machine comprises a frame 1 portably mounted on treads 2. Pivotally mounted on the frame 1 at 3 is a combined shovel and conveyor mechanism 4 which carries the conveyor elements 5 driven by a pair of chains 6 and 7. The material is discharged from this front conveyor to a second or tail conveyor 8, which may be pivotally mounted on the loading machine frame. The frame of the loading machine also has means to provide pivotal bearings for the forwardly extending arms 9, the bearings being indicated at 10. The arms 9 carry transverse shafts 11 and a pair of angularly extending frame members 12 upon the outer ends of which is mounted a gathering or raking roller 13. The driving of the roller and conveying mechanism as well as other movements of the machine are produced by means of power from a centrally located motor 14 which drives a transverse shaft 15 through a bevel gear 16, and bevel pinion 17 on the motor shaft. A spur pinion 18 may be connected to the shaft 15 under the control of a friction disc clutch 19 for driving a large spur gear 20 which is keyed to a hollow shaft 21 parallel with the shaft 15. A dental clutch member 22 is splined to a shaft 23 rotatable in the hollow shaft 21 and this clutch may be operated by a suitable shipper mechanism (not shown) to connect shaft 21 with either a gear 24 connected to a hub 25 of the gear 20 or a gear 26 which is journaled on a sleeve 27. These connections are effected by means of teeth 28 on either gear. Gear 26 is adapted to be driven from the gear 24 through the set of gearing which includes a spur gear 29 meshing with gear 24, gear 30 mounted on a stub shaft 31 and meshing with gear 29. The shaft 31 also carries a gear 32 which meshes with gear 26. The hollow shaft 21 has a pair of sprockets 33 keyed thereto for driving the conveyor chains 6 and 7 as shown in Fig. 1. At each end of the shaft 23 there is secured a sprocket 34, which sprockets drive a pair of chains 35 extending along the arms 9 and these chains cooperate with a pair of sprockets on the transverse shafts 11 for driving the latter. These shafts may also carry another pair of sprockets which drive a pair of chains 36 engaging sprockets 37 on the roller 13. These latter chains may be provided with a series of teeth 38, some of which may be arranged to cut in one direction and others arranged to cut in another direction.

The novel and improved roller is best illustrated in Figs. 4 and 5. The roller shaft 13 is transversely bored as indicated at 39 and in each of these bores there is mounted a stub shaft 40 having an extension 41 to provide a journal for the bit holding members 42. These members may be secured to the stub shaft by means of a suitable pin and groove connection as plainly illustrated. A set screw 43 serves to hold each of the bits 44 securely in a recess 45 of the member 42. The lengths of the bits are so adapted to the construction of its arms that the points of the bits fall short of extending to the axial line of the extensions 41, whereby the bits with a caster action automatically assume a position pointing in their direction of movement.

Each of the arms 9 may have an arcuate rack 46 fixed thereto and the loading machine frame has a forward extension 47 upon which is mounted a gear 48 which may be driven by means of a chain 49. A second spur pinion 50 may be connected to the shaft 15 under the control of a friction clutch 51 and this pinion drives a spur gear 52 journaled on the shaft 23 and having a sleeve 53 secured thereto. This sleeve carries a sprocket 54 for driving the chain 49.

The operation of my invention should be readily understood in view of the above description and the operation of the driving mechanism for the conveyor and other elements needs only brief explanation. The motor 14 drives the shaft 15 upon the application of the friction clutch 19 and through the gears 18 and 20 drives the hollow shaft 21, which carries the sprockets 33 for driving the conveyor mechanism. When clutch 22 is moved to the right as shown in Fig. 2, shaft 23 will be connected directly to the hollow shaft 21 and the sprockets 34 will be rotated in one direction, which rotation is transmitted to the gathering roller 13 through the chains 35 and 36. When it is desired to rotate the roller in the opposite direction the clutch 22 is moved to the left to connect shaft 23 with gear 26 whereby rotation of the roller takes place in the opposite direction since there is an odd number of gears between shafts 23 and 21. During normal operation when the material to be loaded is in a fairly loose condition, the roller will be rotated counter-clockwise as viewed in Fig. 1, so that the teeth on the roller will serve to move the material toward the conveyor mechanism. If the material is found to be in a compact state, the roller may be reversed, whereupon the teeth will assume the position shown in Fig. 5 and the material will be lifted and torn apart in a more effective manner. By means of the fact that the points of the teeth 44 are offset a certain amount from the center lines of the axes of rotation of the tooth holders the teeth 24 will always tend to swing as far as possible away from the direction of rotation and thereby assume their most effective gathering position.

While I have in this application specifically described one form which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a loading machine, a reversible gathering roller, means for driving same in opposite directions, said roller having a series of shafts extending transversely thereof, a tooth holding member swiveled on each of said shafts, and teeth carried by said tooth holding members and having their points offset from the center line of said shafts.

2. In a loading machine, material gathering means comprising a reversible roller, means for driving said roller in opposite directions, and tooth holding members pivotally connected to said roller on axes traversing said roller at right angles to its axis of rotation.

3. In a loading machine, material gathering means including a material disintegrating member rotatable in either of opposite directions, means for driving said member in opposite directions, and teeth pivotally mounted on said member and each being arranged to have reversed cutting positions automatically upon reversal of said member.

4. In a loading machine, material gathering means including a reversible material gathering element, and a plurality of reversible gathering tools each having a plurality of normally operative work engaging positions and adjustably mounted on said gathering element for movement, by engagement of the tools with the work, into one or the other of their operative positions automatically in accordance with the direction of rotation of said gathering element.

5. In a loading machine, material gathering means including a reversible material gathering element, and tool holders each carrying a reversible tool having a plurality of normally operative work engaging positions and adjustably mounted on said gathering element for movement, by engagement of the tools with the work, into one or the other of their operative positions to reverse the tools automatically in accordance with the direction in which said gathering element is driven.

6. In a loading machine, material gathering means including a reversible material gathering roller, and tool holders each carrying a reversible tool having a plurality of normally operative work engaging positions and pivotally mounted on said roller for movement, by engagement of the tools with the work, into one or the other of the operative positions to reverse the tools automatically in accordance with the direction in which said roller is rotated.

7. In a loading machine, material gathering means including a reversible material gathering roller, and tool holders each carrying a reversible tool and having a plurality of operating positions and pivotally mounted on said roller for swinging movement about axes transverse to the roller axis and swingable about their axes, by engagement of the tools with the work, into one or the other of the operating positions to reverse the tools automatically in accordance with the direction in which said roller is rotated.

8. In a loading machine, material gathering means including a reversible material gathering roller, and tool holders each carrying a reversible tool having a material engaging point, said tool holders having a plurality of operating positions and pivotally mounted on said roller for swinging movement about axes transverse to the roller axis and swingable about their axes, by engagement of the tools with the work, into one or the other of their operating positions to reverse the tools automatically in accordance with the direction in which said roller is rotated, the points of the tools being offset from the axes of the tool holders.

9. In a loading machine, material gathering means including a reversible material gathering roller, and tooth holders pivotally mounted on said roller and each carrying a reversible tooth, each tooth holder being swingable, by engagement of its tooth with the work, about the pivotal axis of the holder to reverse its tooth to an opposite work engaging position upon reversal of said roller.

10. In a loading machine, material gathering means including a material gathering roller rotatable in opposite directions, a plurality of members pivotally connected to said rollers, each member carrying a reversible tooth and being swingable about its pivotal axis, by engagement of its tooth with the work, to reverse the operative position of the tooth automatically in accordance with the direction of roller rotation.

11. In a loading machine, material gathering means including a material gathering roller rotatable in opposite directions, said roller having a plurality of shafts extending transversely thereof, a tooth holding member swiveled on each of said shafts, and reversible teeth carried by said tooth holding members and having their material engaging points offset from the center line of said shafts, said tooth holding members being swingable, by engagement of the teeth with the work, to reverse the position of the teeth automatically in accordance with the direction of roller rotation.

12. In a loading machine, material gathering means including a reversible material gathering roller rotatable in opposite directions, and tooth holding members pivotally connected to said roller on axes traversing said roller at right angles to its axis of rotation, said tooth holding members being swingable about their pivots, by engagement of the teeth with the work, to reverse the teeth automatically in accordance with the direction of roller rotation.

13. A material working mechanism comprising a reversible tool actuating member, a tool, and means supporting said tool by said actuating member whereby a castering action of the tool may be had upon reversal of said actuating means.

In testimony whereof I affix my signature.

ANDREW HAUGE.